UNITED STATES PATENT OFFICE.

KARL STEPHAN AND PAUL REHLÄNDER, OF BERLIN, GERMANY, ASSIGNORS TO CHEMISCHE FABRIK AUF ACTIEN, VORM. E. SCHERING, OF BERLIN, GERMANY.

PROCESS OF MAKING CAMPHOR.

No. 801,485.  Specification of Letters Patent.  Patented Oct. 10, 1905.

Application filed May 11, 1905. Serial No. 259,936.

*To all whom it may concern:*

Be it known that we, KARL STEPHAN and PAUL REHLÄNDER, both doctors of philosophy, chemists, subjects of the German Emperor, residing at the city of Berlin, Kingdom of Prussia, German Empire, have invented a new and useful Improvement in the Manufacture of Camphor, of which the following is a specification.

We have discovered that camphor may be produced by oxidizing borneol or isoborneol by means of oxygen or air with or without the use of so-called "catalytic" reagents. It was by no means obvious that the oxidation could be effected in this way without difficulty and without the formation of aldehydes or other ketones as it is the case with some other oxidizing agents—for instance, with manganese and sulfuric acid.

The process is illustrated by the following examples:

1. One kilogram of isoborneol is heated to about 160° centigrade and transformed into vapors by the slow passage of oxygen over it. The resulting mixture of vapors is led at a temperature of about 180° centigrade over spirals of copper wire and is maintained at this temperature for about three hours. After cooling a product of sublimation is obtained which contains twenty per cent. of camphor with unaltered isoborneol. The latter is separated by known methods and used over again in the manufacture. Other ketones or aldehydes are not produced. Only very small quantities of carbonic acid are formed.

2. One kilogram of isoborneol is heated to about 170° centigrade and volatilized by a current of air. The vapors are passed over copper wire at a temperature of 175° to 177° centigrade, care being taken that they remain in contact with the heated copper for about three hours. The cooled product of sublimation contains about six per cent. of camphor with unchanged isoborneol.

3. One kilogram of isoborneol is heated to about 180° centigrade and gradually volatilized by the passage of two hundred and fifty liters of oxygen over it. The vapors are passed through a glass tube heated to about 180° centigrade, which is filled with some inert substance, such as fragments of earthenware. A mixture of camphor, camphene, and isoborneol results, which is further treated in the known manner to obtain pure comphor. The oxidation of borneol is effected in the same way.

4. Borneol vapor at a temperature of about 195° centigrade is led, together with a stream of oxygen, through a copper tube filled with an inert substance, such as broken earthenware. After the action has proceeded for, say, eight hours a product is obtained which contains about twenty-five per cent. of camphor.

The yield in camphor is somwhat less if air be used to oxidize the borneol.

Excepting the unaltered borneol the only by-products formed are a small quantity of carbonic acid and water.

In referring in the claims to "borneol" we desire to embrace by said term also "isoborneol" as an equivalent substance for the purposes of this invention, and in referring in the claims to "oxygen" we desire to embrace not only substantially pure oxygen, but also suitable gases which contain oxygen—for instance, air.

We claim as our invention—

1. The process of manufacturing camphor which consists in heating the vapor of borneol together with oxygen, and separating the resulting camphor, substantially as set forth.

2. The process of manufacturing camphor which consists in vaporizing borneol, subjecting the vapor to the action of oxygen, and separating the resulting camphor, substantially as set forth.

3. The process of manufacturing camphor which consists in heating the vapor of borneol together with oxygen in the presence of catalytic reagents, and separating the resulting camphor, substantially as set forth.

4. The process of manufacturing camphor which consists in vaporizing borneol, subjecting the vapor to the action of oxygen in the presence of catalytic reagents, and separating the resulting camphor, substantially as set forth.

In testimony whereof we have signed our names to this specification in the presence of two subscribing witnesses.

KARL STEPHAN.
PAUL REHLÄNDER.

Witnesses:
HENRY HASPER,
WOLDEMAR HAUPT.